US011932030B2

(12) United States Patent
Pun et al.

(10) Patent No.: US 11,932,030 B2
(45) Date of Patent: *Mar. 19, 2024

(54) INKJET PRINTER WITH TEMPERATURE CONTROLLED SUBSTRATE SUPPORT

(71) Applicant: Kateeva, Inc., Newark, CA (US)

(72) Inventors: Digby Pun, San Jose, CA (US); Cormac McKinley Wicklow, Newark, CA (US); Christopher Buchner, Sunnyvale, CA (US); Alexander Sou-Kang Ko, Santa Clara, CA (US)

(73) Assignee: Kateeva, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,693

(22) Filed: Apr. 18, 2023

(65) Prior Publication Data

US 2023/0249485 A1 Aug. 10, 2023

Related U.S. Application Data

(63) Continuation of application No. 17/457,721, filed on Dec. 6, 2021, now Pat. No. 11,660,891, which is a continuation of application No. 16/713,218, filed on Dec. 13, 2019, now Pat. No. 11,225,097.

(60) Provisional application No. 62/814,529, filed on Mar. 6, 2019, provisional application No. 62/782,595, filed on Dec. 20, 2018.

(51) Int. Cl.

| | |
|---|---|
| ***B41J 11/00*** | (2006.01) |
| ***B41J 3/407*** | (2006.01) |
| ***B41J 29/377*** | (2006.01) |
| *B41J 3/28* | (2006.01) |

(52) U.S. Cl.
CPC ............. *B41J 29/377* (2013.01); *B41J 3/407* (2013.01); *B41J 11/001* (2013.01); *B41J 11/0015* (2013.01); *B41J 3/28* (2013.01)

(58) Field of Classification Search
CPC ........ B41J 29/377; B41J 3/407; B41J 11/001; B41J 11/0015; B41J 3/28
See application file for complete search history.

(56) References Cited

U.S. PATENT DOCUMENTS 5,611,278 A 3/1997 Garner et al.
5,816,155 A 10/1998 Stephan
11,225,097 B2 * 1/2022 Pun ...................... B41J 11/0015
(Continued)

FOREIGN PATENT DOCUMENTS

CN 103502015 A 1/2014
JP 2008147293 A * 6/2008 ............. H01L 21/68
(Continued)

OTHER PUBLICATIONS

International Search Report and Written Opinion dated Apr. 7, 2020 to PCT/US19/66493.
(Continued)

*Primary Examiner* — Yaovi M Ameh
(74) *Attorney, Agent, or Firm* — Hauptman Ham, LLP

(57) ABSTRACT

An inkjet printer is described. The inkjet printer has a gas cushion substrate support having a metal support surface; a print assembly with a dispenser having ejection nozzles facing the support surface; a gas source fluidly coupled to the gas cushion substrate support by a gas conduit; and a thermal control system coupled to the gas conduit.

20 Claims, 9 Drawing Sheets

(56) References Cited

U.S. PATENT DOCUMENTS

| | | | | |
|---|---|---|---|---|
| 11,660,891 | B2 * | 5/2023 | Pun | B41J 3/407 347/16 |
| 2001/0038177 | A1 | 11/2001 | Spurk | |
| 2006/0081144 | A1 | 4/2006 | Truong | |
| 2009/0031579 | A1 | 2/2009 | Piatt et al. | |
| 2016/0236494 | A1 * | 8/2016 | Mauck | B01D 46/0039 |
| 2017/0004983 | A1 | 1/2017 | Madigan et al. | |
| 2017/0141310 | A1 * | 5/2017 | Madigan | H10K 71/00 |

FOREIGN PATENT DOCUMENTS

| | | | |
|---|---|---|---|
| JP | 2008147293 | A | 6/2008 |
| TW | 201613769 | A | 4/2016 |
| WO | 2012147760 | A1 | 11/2012 |
| WO | 2014026205 | A2 | 2/2014 |

OTHER PUBLICATIONS

Non-Final Office Action dated May 10, 2021 for U.S. Appl. No. 16/713,218.

Notice of Allowance dated Oct. 14, 2021 for U.S. Appl. No. 16/713,218.

TW Examination Report dated Dec. 6, 2022 for TW Patent Application No. 108141522.

Non-Final Office Action dated Oct. 12, 2022 for U.S. Appl. No. 17/457,721.

Notice of Allowance dated Jan. 24, 2023 for U.S. Appl. No. 17/457,721.

* cited by examiner

INKJET PRINTER WITH TEMPERATURE CONTROLLED SUBSTRATE SUPPORT

CROSS-REFERENCE TO RELATED APPLICATIONS

This patent application is a continuation of U.S. patent application Ser. No. 17/457,721, filed Dec. 6, 2021, which is a continuation of U.S. patent application Ser. No. 16/713,218, filed Dec. 13, 2019, now U.S. Pat. No. 11,225,097, issued on Jan. 18, 2022, which claims benefit from U.S. Provisional Patent Application Ser. No. 62/782,595 filed Dec. 20, 2018, and U.S. Provisional Patent Application Ser. No. 62/814,529 filed Mar. 6, 2019, each of which is incorporated herein by reference in its entirety.

FIELD

Embodiments of the present invention generally relate to inkjet printers. Specifically, methods and apparatus for substrate temperature control during processing are described.

BACKGROUND

Inkjet printing is common, both in office and home printers and in industrial scale printers used for fabricating displays, printing large scale written materials, adding material to manufactured articles such as PCB's, and constructing biological articles such as tissues. In some cases the precision required in depositing materials on a substrate by inkjet printing is extreme. For example, in display applications, materials may be printed onto a substrate using droplets of liquid print material having dimensions of 10-15 μm that are deposited at targets locations of dimension about 20 μm. For large substrates, a change in temperature of the substrate can result in dimension changes in the substrate exceeding the size of the target location, leading to droplet location uncertainty that results in printing faults.

There is a need for strict temperature control of large substrates during inkjet printing processes.

SUMMARY

Embodiments described herein provide an inkjet printer, comprising a gas cushion substrate support having a metal support surface; a print assembly with a dispenser having ejection nozzles facing the support surface; a gas source fluidly coupled to the gas cushion substrate support by a gas conduit; and a thermal control system coupled to the gas conduit.

Other embodiments described herein provide an inkjet printer, comprising a gas cushion substrate support comprising a first staging area, a second staging area, and a printing area; a print assembly with a dispenser having ejection nozzles facing a support surface of the printing area; a gas source fluidly coupled to the first staging area by a first gas conduit, to the second staging area by a second gas conduit, and to the printing area by a third gas conduit; and a thermal control unit comprising a heat exchanger thermally coupled to at least the first gas conduit.

Other embodiments described herein provide an inkjet printer, comprising a gas cushion substrate support comprising a first staging area, a second staging area, and a printing area; a print assembly with a dispenser having ejection nozzles facing a support surface of the printing area; a gas source fluidly coupled to the first staging area by a first gas conduit, to the second staging area by a second gas conduit, and to the printing area by a third gas conduit; a thermal control unit comprising a plate heat exchanger connected to at least the first gas conduit, a thermal element, and a thermal medium conduit connecting the heat exchanger to the thermal element; a gas effluent conduit connecting the plate heat exchanger to the first staging area; and a temperature sensor thermally coupled to an interior of the gas effluent conduit.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
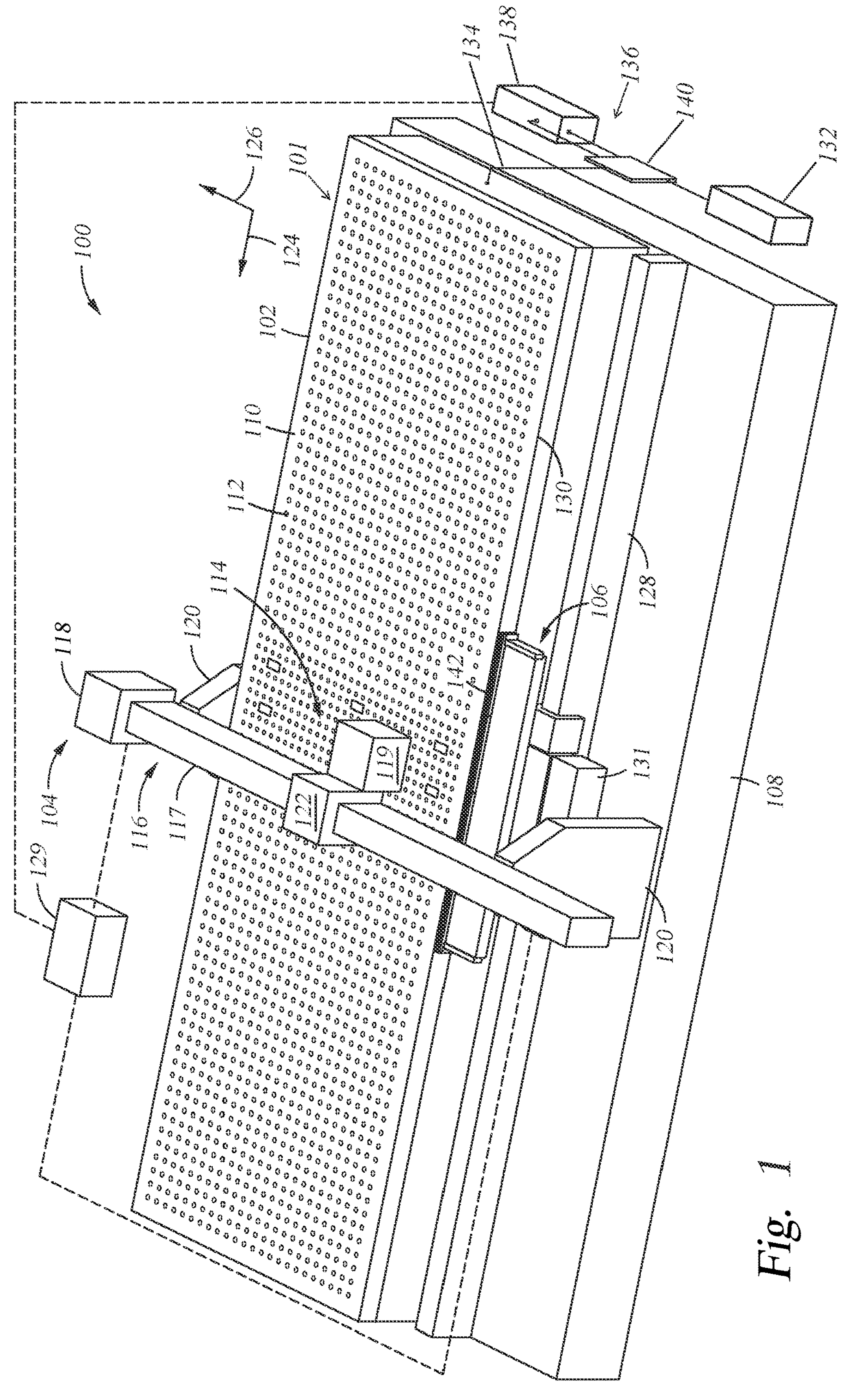
FIG. 1 is an isometric view of an inkjet printer according to one embodiment.

An inkjet printer is described herein with support alignment features. FIG. 1 is an isometric view of a portion of an inkjet printer 100 according to one embodiment. The printer 100 features a base 108, which is a structurally strong and stable material such as granite, a print assembly 104 disposed on the base 108, and a substrate support assembly 101 disposed on the base 108. The substrate support assembly 101 includes a substrate support 102 having a substrate support surface 110 over which a substrate is disposed for processing. The substrate is supported above the substrate support surface 110 by a gas cushion.

The print assembly 104 includes a dispenser support assembly 116 comprising a rail 117 coupled to a pair of stands 120. The stands 120 are disposed on the base 108 on either side of the substrate support 102. The rail 117 is oriented transverse to the substrate transportation direction, in a "cross-scan" direction, and extends across the substrate support surface 110 in the cross-scan direction. A dispenser assembly 114 is movably coupled to the rail 117, and moves along the rail 117 to position the dispenser support assembly 114 at target locations with respect to a substrate disposed supported by the substrate support 102. The dispenser assembly 114 includes a dispenser housing 119, which holds one or more dispensers (not shown), coupled to a carriage 122. The carriage 122 is coupled to the rail 117, for example by a bearing apparatus or assembly, such as an air bearing, and is moved along the rail by a linear actuator. The dispenser assembly 114 can move substantially from one stand 120 to the opposite stand 120 in the cross-scan direction to access substantially all of the transverse dimension of the substrate supported by the substrate support 102. The stands 120 and the rail are made of structurally strong, stable material and may be integral with the base 108.

The substrate support 102 is a gas cushion support. The substrate support 102 creates a gas cushion along the support surface 110 of the substrate support 102. A substrate is supported on the gas cushion above the surface 110. The substrate is thus able to move essentially frictionlessly along the surface 110. A holder assembly 106 is disposed near an edge 130 of the substrate support 102 to contact an edge region of a substrate disposed on the substrate support 102. A contact member 142 of the holder assembly 106 contacts the edge region of the substrate and applies vacuum to acquire a secure hold on the substrate. The holder assembly 106 moves the substrate on the gas cushion to position the substrate for deposition of material on the substrate from the dispenser 119. The holder assembly has a holder carriage 131 that is coupled to a holder rail 128. The holder rail 128 extends along the edge 130 of the substrate support 102 substantially the entire length thereof to provide the holder assembly 106 freedom to move the substrate from one end of the substrate support 102 to the opposite end. The holder rail 128 may be formed integrally with the base 108 or attached to the base 108.

The support surface 110 has a plurality of holes 112 that flow gas through the support surface 110 to form the gas cushion that supports the substrate. The holes may be specially formed in the support surface 110, or the support surface 110 may be made of a porous material, thus giving rise to holes naturally. Gas is supplied below the support surface 110 into one or more plenums (not shown) that distribute gas to the holes 112 to provide uniform gas flow and gas cushion support for the substrate. The substrate support assembly 101 includes a blower 132 that provides gas, for example air, conditioned air, oxygen depleted air, nitrogen, or other inert gas, to the substrate support 102 to form the gas cushion at the surface 110. The blower 132 is fluidly coupled to the surface 110 by a gas conduit 134.

In operation, a substrate is disposed on or above the substrate support surface 110 near an end of the substrate support 102. The gas cushion is established before or after the substrate is disposed on or above the substrate support surface 110. An edge region of the substrate engages with the holder assembly 106, which acquires a secure connection with the substrate by the contact member 142. The holder assembly 106 then translates along the holder rail 128 to move the substrate in a first direction 124 along the support surface 110 to bring the substrate into processing position between the stands 120 such that print nozzles of the dispensers in the dispenser housing 119 are facing the substrate. The dispenser assembly 114 moves along the rail 117 in a second direction 126 transverse to the first direction 124, while the holder assembly 106 moves the substrate in the first direction 124 to perform a print job. The first direction 124 is sometimes called the scan direction while the second direction 126 is sometimes called the cross-scan direction.

In some cases, a substrate to be processed on the printer 100 is large, for example having GEN 8.5 dimensions of 2.2 m×2.5 m. Variation in temperature of such large substrates can result in dimensional changes of 25-50 μm. For printers adapted to deposit drops of material 10-15 μm in dimension into target locations of around 20 μm, such thermal dimension changes inject unacceptable imprecision into the print process. To manage thermal dimensional change of the substrate, the substrate support assembly 101 includes a thermal control system 136 coupled to the gas conduit 134. The thermal control system 136 includes a thermal unit 138 coupled to a heat exchanger 140. The blower 132 is also coupled to the heat exchanger 140, which is also coupled to the gas conduit 134.

The printer 100 is controlled by a controller 129, which is coupled to the print assembly 104, the holder assembly 106, and the thermal control system 136. An optional print assembly controller 118 is coupled to the print assembly 104, and here the controller 129 is coupled to the print assembly controller 118. The holder assembly 106 may also have a controller coupled to the controller 129. The controller 129 controls positioning of the dispenser assembly 114, positioning of the holder assembly 106, and ejection of print material from the dispensers in the dispenser housing 119 to perform the print job.

Figure 2A:
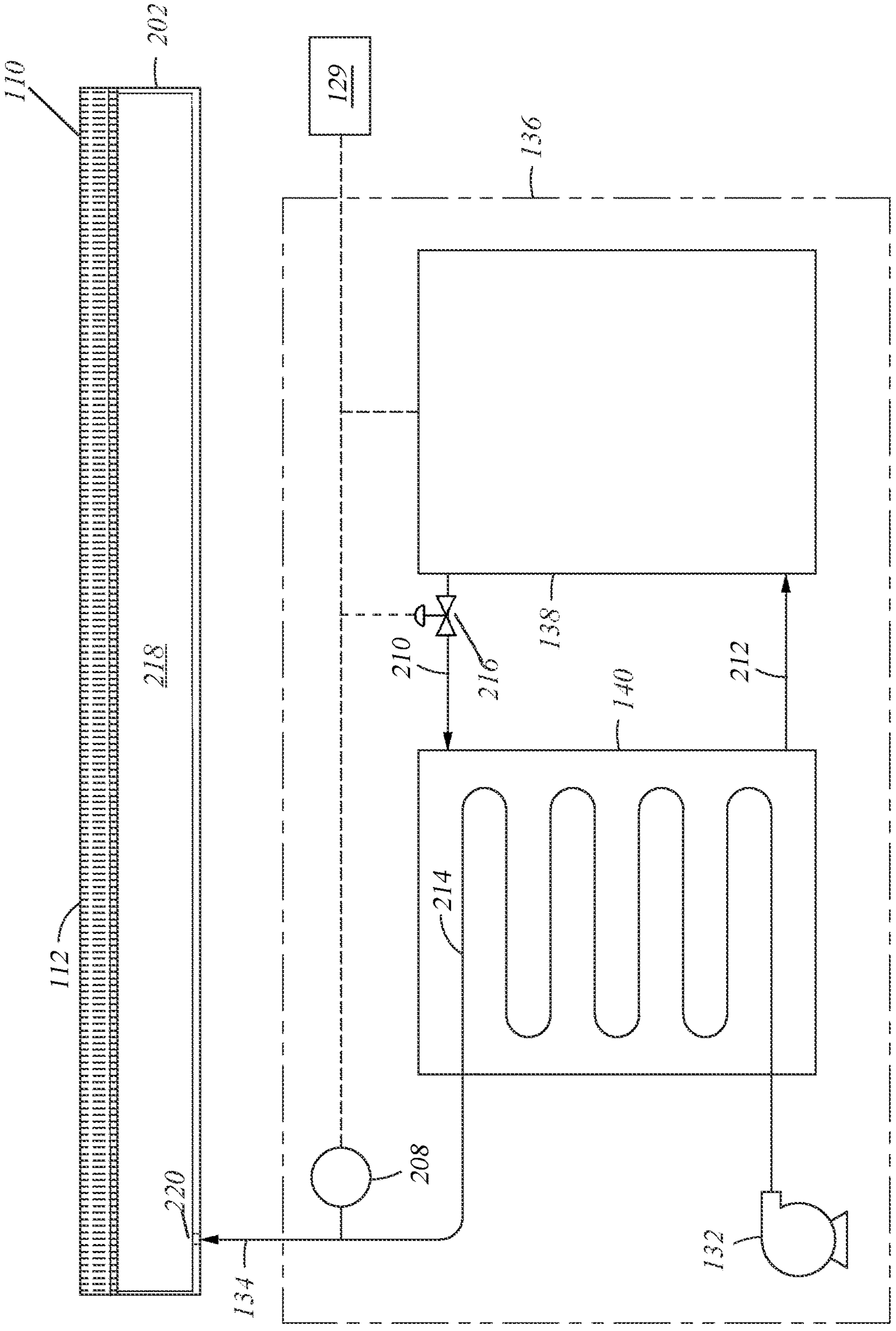
FIG. 2A is a detailed view of a thermal control system for use with the inkjet printer of FIG. 1, according to one embodiment.

FIG. 2A is a detail view of the thermal control system 136 of FIG. 1, according to one embodiment. The heat exchanger 140 shown here is a plate type heat exchanger, but other types of heat exchangers can also be used, such as box heat exchangers, jacketed pipe heat exchangers, and sphere heat exchangers. Gas from the blower 132 is circulated through a conduit 214 of the heat exchanger 140. The conduit 214 is coupled to the gas conduit 134, which is, in turn, coupled to a substrate support 202. The substrate support 202 can be used as the substrate support 102 in the inkjet printer 100 of FIG. 1. The thermal unit 138 is coupled to the heat exchanger 140 by a thermal medium conduit 210 through which a thermal medium flow from the thermal unit 138 to the heat exchanger 140, and by a return conduit 212 through which the thermal medium flows from the heat exchanger 140 to the thermal unit 138. The thermal unit 138 is a heater or a cooler, or both, depending on the thermal characteristics of the inkjet printer, and the thermal medium may be any fluid suitable for temperatures normally experienced. Water can be used as the cooling fluid in many cases.

A temperature sensor 208 is coupled to the gas conduit 134. The temperature sensor 208 senses a temperature that indicates temperature of the gas flowing in the gas conduit 134. In one example, the temperature sensor 208 is a thermocouple that is positioned at least partially inside the gas conduit 134 in the flowing gas to directly sense the temperature of the flowing gas. In other examples, the temperature sensor 208 is a non-contact sensor that engages with the gas conduit 134 to sense temperature of the gas, either through direct contact with the gas conduit 134 or through non-contact means, such as optical sensing. The temperature sensor 208 is operatively coupled to the controller 129 to send signals representing the temperature of the gas flowing through the gas conduit 134 to the controller 129. The controller 129 determines a temperature of the gas from the signals. The thermal unit 138 is also operatively coupled to the controller 129 to receive signals from the controller 129 for controlling operation of the thermal unit 138.

An optional control valve 216 may be disposed in the thermal medium conduit 210 to control a flow rate of the thermal medium to the heat exchanger 140. Controlling flow of the thermal medium to the heat exchanger 140 can control thermal duty of the heat exchanger 140, and therefore temperature of the gas flowing to the substrate support 202 through the gas conduit 134. The controller 129 may also be operatively coupled to the control valve 216. Thus, the controller 129 receives signals representing temperature of the gas from the temperature sensor 208, determines temperature of the gas from the signals, compares the temperature to standard, such as a target temperature, and generates control signals to send to the thermal control system 136. The controller 129 may send control signals to the thermal unit 136, for example thermal flux signals to control the thermal flux of the thermal unit 136, the controller 129 may send control signals to the optional control valve 216 to control thermal flux to the heat exchanger 140, or both. The controller 129 thus controls thermal duty of the heat exchanger 140 based on the temperature readings of the temperature sensor 208.

Thermal state of the gas flowing through the gas conduit 134 is controlled to have a desired thermal effect on the substrate disposed on the substrate support 202. The gas flows through the openings 112 in the support surface 110 and creates a gas cushion that supports the substrate above the support surface 110. The temperature of the gas also affects the temperature of the substrate. The thermal flux between the substrate and the gas can be used to reduce variation of substrate temperature, and the accompanying dimensional variation in the substrate that can cause printing faults in precision print jobs.

The substrate support 202 is made of a thermally conductive material, such as metal, for example aluminum. The substrate support surface 110 thus also has a thermal effect on the substrate. The substrate support 202 may have a plenum 218 into which the gas flows prior to flowing through the openings 112. The plenum 218 can serve to distribute the gas evenly among all the holes 112. The gas enters the body of the substrate support 202 through an inlet 220 and flows into the plenum 218. From the plenum 218, the gas flow through the openings 112 in the surface 110. The gas interacts thermally with the surface 110 and thermally stabilizes the surface 110 relative to environmental thermal effects. In addition to the thermal interaction of the substrate with the gas cushion, the thermally stabilized surface 110 interacts thermally with the substrate positioned just above the surface 110 on the gas cushion to thermally stabilize the substrate.

In this way, the temperature of the gas flowing through the gas conduit 134, detected by the temperature sensor 208, can be used to thermally stabilize the substrate. If the printing chamber in which printing processes are performed on the substrate warms up due to operation of machinery, a cooler can be used as the thermal unit 138, and the gas used for the gas cushion can be cooled by the heat exchanger 140. The cool gas impinges on the substrate and cools the substrate supporting surface 110. Both the cooled gas cushion and the cool support surface 110 help thermally stabilize the substrate against environmental warming that would change the linear dimensions of a large substrate by up to 50 μm and would cause printing faults.

Figure 2B:
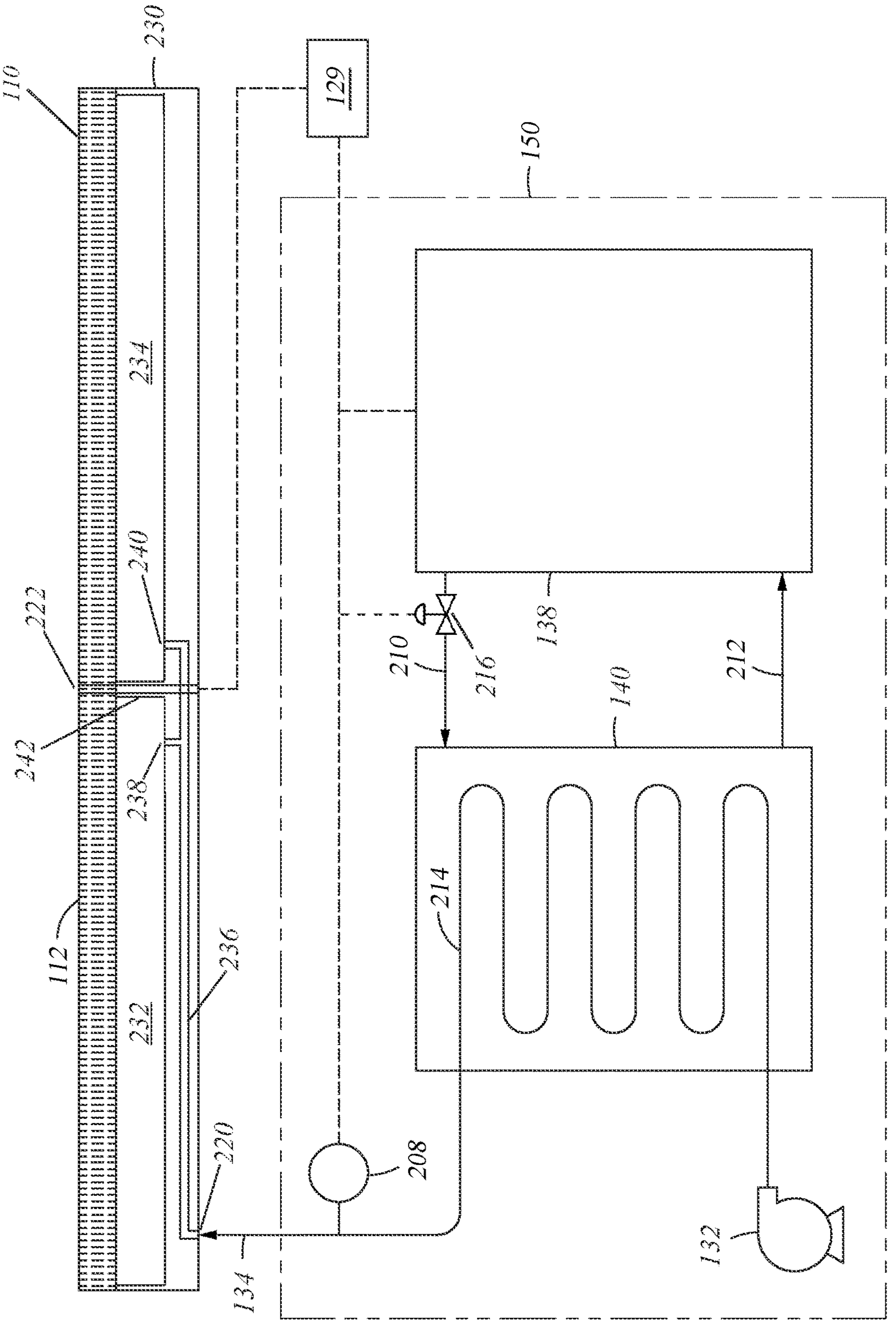
FIG. 2B is a detailed view of a thermal control system for use with the inkjet printer of FIG. 1, according to another embodiment.

FIG. 2B is a detailed view of another thermal control system 150 that can be used as the thermal control system 136 of FIG. 1. The thermal control system 150 is similar to the thermal control system 136 of FIG. 2A. The thermal control system 150 features a second thermal sensor 222 disposed in the support surface 110 to sense a temperature of the substrate supported above the surface 110 on the gas cushion, or a temperature of the support surface 110 itself. The second thermal sensor 222 may be an optical sensor for sensing the substrate or a contact sensor, such as a pyroelectric or piezoelectric device. Although one thermal sensor 222 is shown disposed in the support surface 110, multiple such sensors may be used, if desired, to monitor temperature uniformity across the support surface 110. The thermal sensors 222 may each, individually, be a thermocouple, a thermistor, a bi-metallic thermostat, a resistance temperature detector, or other suitable pyroelectric device or other type of thermal sensor.

FIG. 2B shows a substrate support 230 with a different internal structure from the substrate support 202. The substrate support 230 can also be used as the substrate support 102 of FIG. 1. Here, the substrate support 230 has at least two internal plenums. A first plenum 232 and a second plenum 234 are shown. Using multiple internal plenums provides additional gas distribution uniformity by forcing the gas to divide into multiple chambers within the substrate support 230. Such arrangements can be useful to avoid center-to-edge nonuniformity in gas distribution that can lead to higher gas cushion pressure near the center of the support surface 110 than at the edge.

The substrate support 230 has an internal distribution manifold 236 that couples the inlet 220 to the first and second plenums 232 and 234. A first portal 238 fluidly couples the manifold 236 to the first plenum 232, and a second portal 240 fluidly couples the manifold 236 to the second plenum 234. The first plenum 232 is separated from the second plenum 234 by a wall 242. Here, the second temperature sensor 222 is disposed through the wall 242 to access the support surface 110. In other versions, the second temperature sensor 222 could be disposed through one of the plenums to reach the support surface 110. As noted above, multiple surface sensors 222 can be used.

Figure 2C:
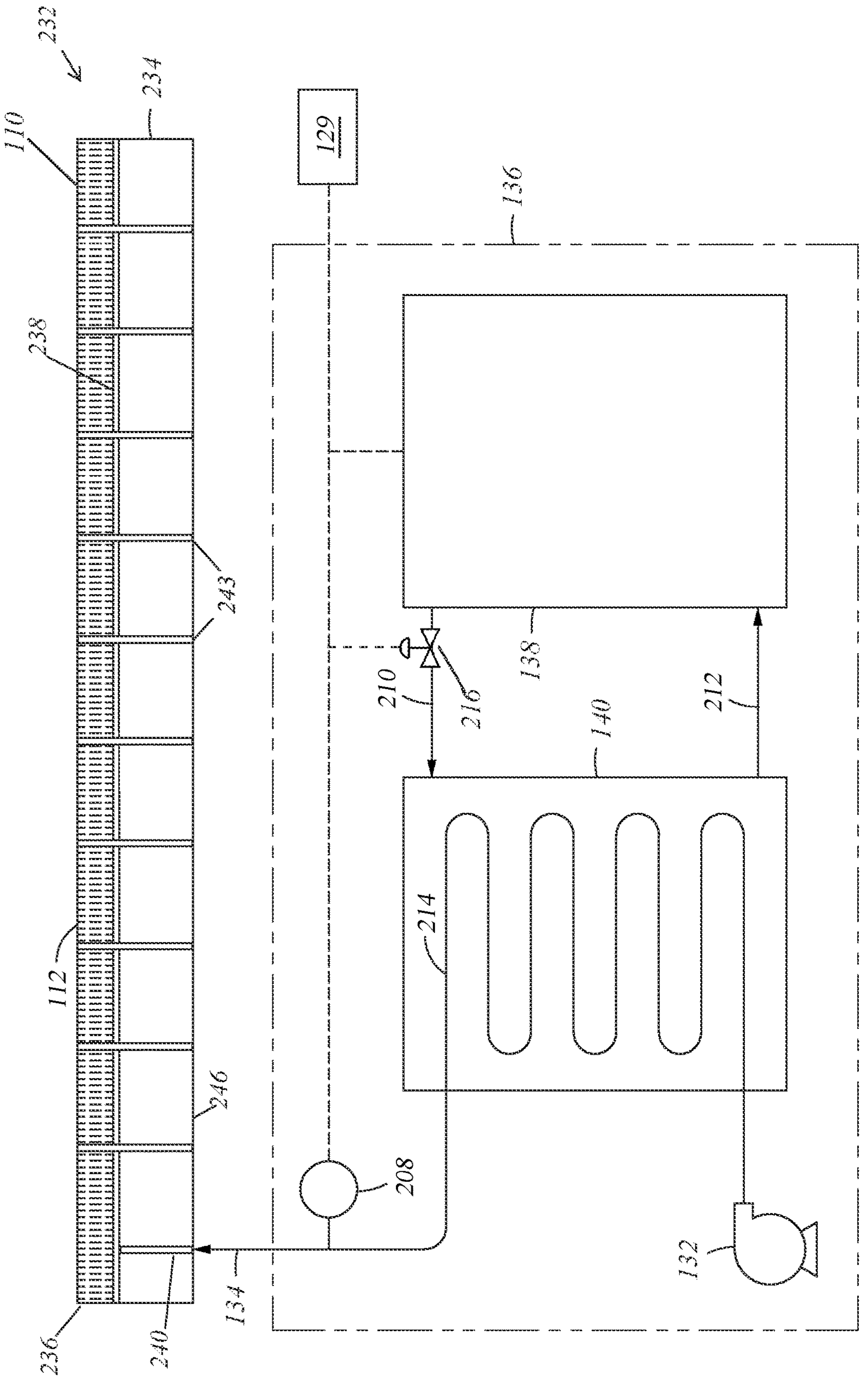
FIG. 2C is a detailed view of a thermal control system for use with the inkjet printer of FIG. 1, according to another embodiment.

FIG. 2C is a detailed view of a thermal control system for use with the inkjet printer 100 of FIG. 1, according to another embodiment. In this embodiment, a substrate support 232 is used that has a support plate 234 supporting a top member 236 that provides the support surface 110. The holes 112 extend through the thickness of the top member 236. A gap 238 between the support plate 234 and the top member 236 provides a plenum for gas flow to allow uniform flow of gas through all the holes 112. The gas flow is provided through a gas flow passage 240 formed through the support plate 234 from a back side 246 of the support plate 234 to the gap 238. A plurality of gas escape passages 243 are also formed through the support plate 234 and through the top member 236, from the back side 246 to the surface 110, to allow gas to evacuate from behind the substrate disposed over the support surface 110. Temperature controlled gas flows through the gas flow passage 240 to the gap 238 and spreads across the substrate support 232 in the gap 238. The gas flows from the gap 238 through the holes 112 in the top member 236 to the surface 110 to form a gas cushion of temperature controlled gas that supports a substrate thereon. Gas also flows from the gas cushion between the substrate and the surface 110 through the gas escape passages 243 from the surface 110 to the back side 246 to evacuate from the substrate support 232. Gas may also flow from the gas cushion to the edge of the substrate, between the substrate and the surface 110 in any of the embodiments of FIGS. 2A, 2B, 2C, and 2D below.

Figure 2D:
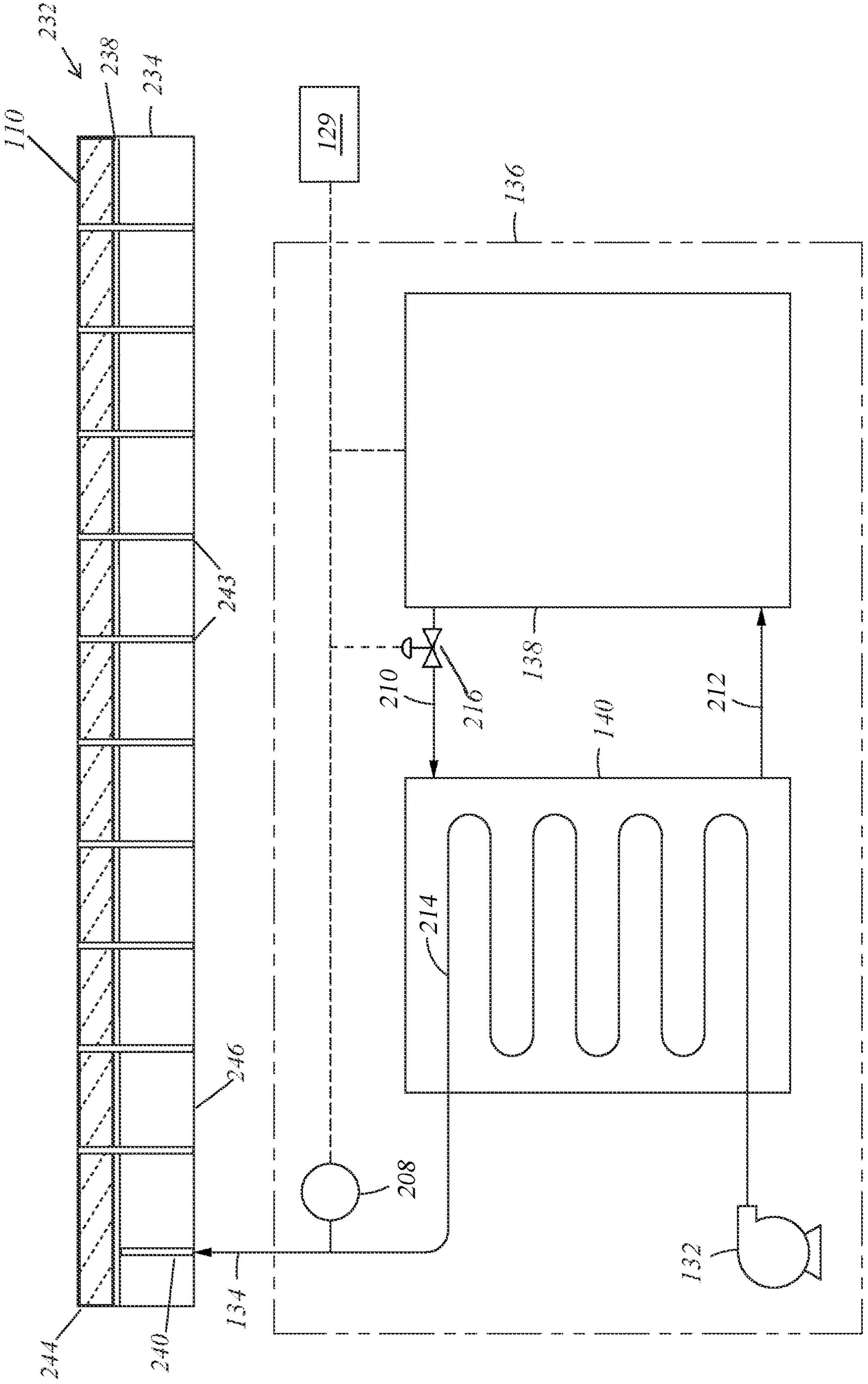
FIG. 2D is a detailed view of a thermal control system for use with the inkjet printer of FIG. 1, according to another embodiment.

FIG. 2D is a detailed view of a thermal control system for use with the inkjet printer 100 of FIG. 1, according to another embodiment. This version has a different top member 244 that is a porous body. The porous top member 244 has passages through the member that allow gas flow through the porous top member 244. The top member 244 may be porous metal or ceramic. As a metal, the top member 244 may be a mesh material. As a ceramic, the top member 244 may be a sintered ceramic powder. Using a porous metal material as the top member 244 provides increased thermal control capacity due to thermal conductivity of the metal.

Figure 3:
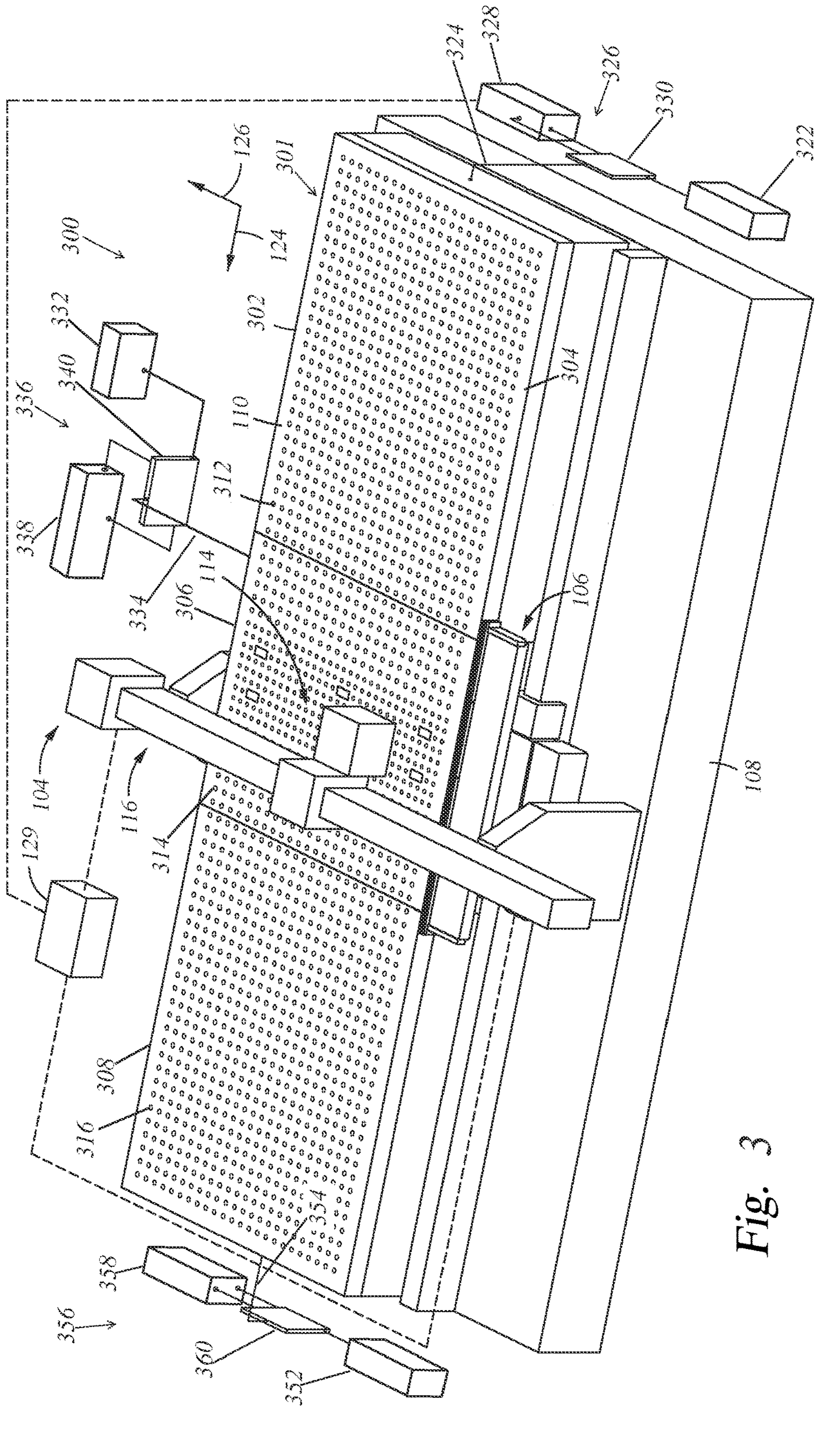
FIG. 3 is an isometric view of an inkjet printer according to another embodiment.

FIG. 3 is an isometric view of an inkjet printer 300 according to another embodiment. The inkjet printer 300 is similar to the inkjet print 100 in most respects. The chief difference here is that the inkjet printer 300 has a substrate support assembly 301 with a substrate support 302 that comprises three substrate support sections. A first substrate support section 304 is positioned at a first end of the substrate support assembly 301. A second substrate support section 306 is positioned in a middle region of the substrate support assembly 301. A third substrate support second 308 is positioned at a second end of the substrate support assembly 301 opposite the first end. The first substrate support section 304 has a support surface 110 with a first plurality of holes 312 for forming a gas cushion support. The second substrate section 306 has a second plurality of holes 314 for forming a gas cushion support. The third substrate support section 308 has a third plurality of holes 316 for forming a gas cushion support. A first blower 322 is fluidly coupled to the first plurality of holes 312, a second blower 332 is fluidly coupled to the second plurality of holes 314, and a third blower 352 is fluid coupled to the third plurality of holes 316. The second plurality of holes 314 may have a first portion of holes for providing gas to the gas cushion and a second portion of holes for providing suction. Use of gas and suction in the second substrate support section 306 can improve position control of substrates during processing. The second blower 332 is fluidly coupled to the first portion of the second plurality of holes 314, while a vacuum source (not shown) is coupled to the second portion of the second plurality of holes 314.

Each substrate support section 304, 306, and 308 has a thermal control system. A first thermal control system 326 is coupled to the first substrate support section 304. A second thermal control system 336 is coupled to the second substrate support section 306. A third thermal control system 356 is coupled to the third substrate support section 306. Each of the thermal control systems 326, 336, and 356 features a heat exchanger coupled to a thermal unit to provide thermal control of the gas flowing from the blower to the substrate support. Thus, a first thermal unit 328 is coupled to a first heat exchanger 330 by a first thermal medium conduit that flow thermal medium from the first thermal unit 328 to the first heat exchanger 330, and by a first return conduit that flow thermal medium from the first heat exchanger 330 to the first thermal unit 328. Gas flows from the first blower 322 to the first heat exchanger 330, undergoes thermal contact with the thermal medium in the first heat exchanger 330, and flow through a first gas conduit 324 to the first substrate support section 304. The second thermal control system 336 includes a second heat exchanger 340 and second thermal unit 338 coupled with the second blower 332 to provide thermally controlled gas through a second gas conduit 334 to the second substrate support section 306. The third thermal control system 356 includes a third heat exchanger 360 and third thermal unit 358 coupled with the third blower 352 to provide thermally controlled gas through a third gas conduit 354.

The three separate substrate support sections 304, 306, 308, with separate thermal control systems 326, 336, and 356 provide individualized thermal and gas cushion control for the three parts of the substrate support assembly 301. In this way, the first substrate support 304 can be a staging area for substrates, with the function of establishing gas cushion support and thermal stability of a substrate prior to moving the substrate into a processing position over the second substrate support section 306. The second substrate support section 306 can provide precise substrate position control using the gas/vacuum controlled gas cushion support of the second substrate support section 306, along with separate thermal control that can be more precise than that of the first substrate support section 304, if desired. The third substrate support section 308 can also be a staging area for substrate, with the function of establishing, or maintaining, gas cushion support and thermal stability. In one case, the first and third substrate support sections 304 and 308 can utilize thermal control systems like those described in connection with FIG. 2A, while the second substrate support section 306 can utilize a thermal control system like that described in connection with FIG. 2B to provide more precise thermal control for substrates being processed on the second substrate support section 306.

It should be noted that the three substrate support sections 304, 306, and 308 may be separable pieces of hardware, or merely sections of an inseparable piece of hardware. For example, the first, second, and third substrate support sections 304, 306, and 308 may be part of one frame but separated by partitions that segregate gas flow and thermal control among the three sections. Alternately, the first substrate support section 304 may be a separate structure that is removable from the inkjet printer 300, and likewise for the second and third substrate support sections 306 and 308. It should also be noted that, in one variation of the system of FIG. 3, the first and third substrate support sections 306 and 308 may together use one thermal control system, such as the first thermal control system 326, omitting the third thermal control system 356. The gas from the first blower 322 is fluidly coupled to the first and third substrate support sections 304 and 308 and the first blower 322 and first thermal control system 326 are sized accordingly.

Figure 4:
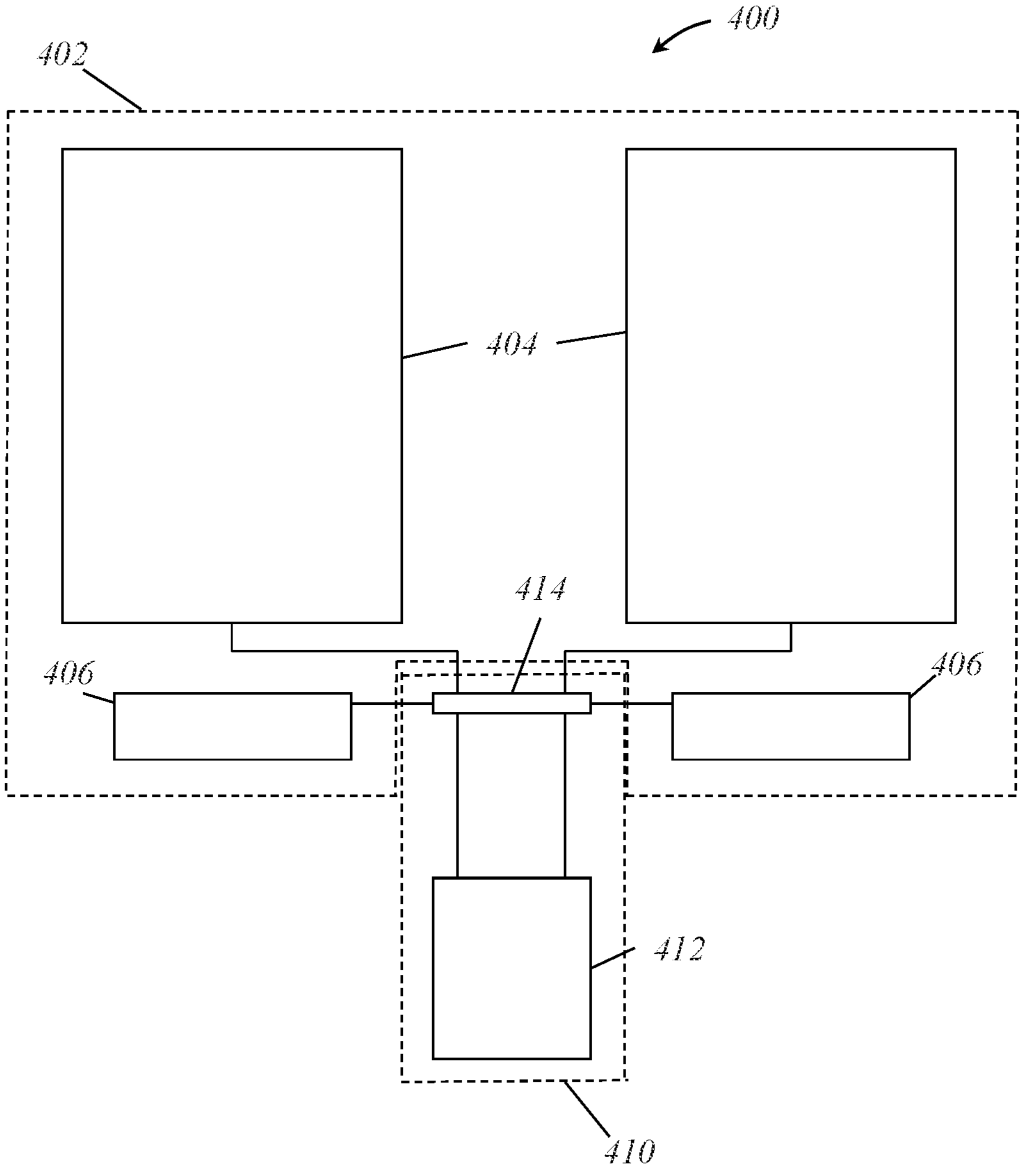
FIG. 4 is a schematic plan view of a printing system according to one embodiment.

FIG. 4 is a schematic plan view of a printing system 400, according to one embodiment. The printing system 400 includes a printing installation 402 that has, in this case, two inkjet printers 404, each of which may be like the inkjet printers 100 or 300, and can be different types of inkjet printers. Each inkjet printer 404 in the printing installation 402 has its own blower 406 to form a gas cushion. Here, one blower 406 is shown for each printer 404, but each printer may have more than one blower 406, for example if the printer 404 is like the printer 300. Each printer 404 may also have a vacuum source, like the printer 300.

The printing system 400 has a thermal control system 410 that includes a thermal unit 412 and a heat exchanger 414. Each blower 406 is fluidly coupled to the heat exchanger 414 to flow gas through the heat exchanger 414 to the corresponding printer 404. The thermal unit 412 is coupled to the heat exchanger 414 by thermal medium and return conduits. The single heat exchanger 414 and thermal unit 412 provide thermal control to all the printers 404 in the print installation 402.

In alternate embodiments, a single thermal unit can be coupled to multiple heat exchangers, one heat exchanger for each printer, and flow of thermal medium to each heat exchanger can be controlled based on thermal conditions of individual printers. For example, if one printer is generally warmer than another printer, more thermal medium can be flowed to the warmer printer to maintain thermal control of substrates in that printer. In other alternate embodiments, a printing system may include multiple printing installations, each having multiple printers. A single heat exchanger may be used for one printing installation. One thermal unit may provide thermal medium to all the heat exchangers under flow control based on the thermal condition of the individual printing installation. Ratios of heat exchangers to printers to thermal units can be determined by the thermal duty of the printing system.

Figure 5:
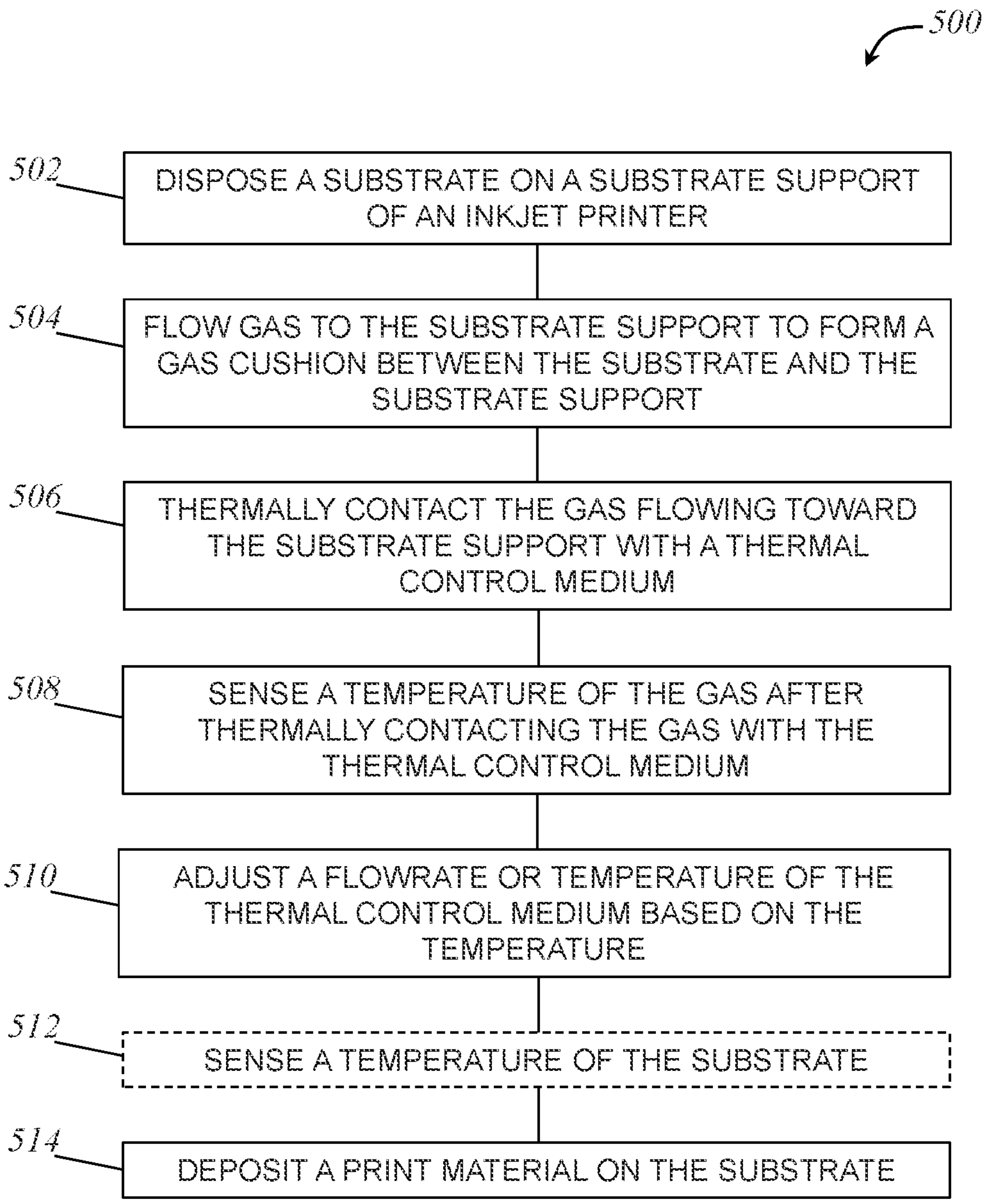
FIG. 5 is a flow diagram summarizing a method according to another embodiment.

FIG. 5 is a flow diagram summarizing a method 500 according to one embodiment. The method 500 is a method of depositing material on a substrate using a precision printing process. At 502, a substrate is disposed on a substrate support of an inkjet printer. The printer may be any of the printers described herein, and may be part of a printing installation of a printing system. The substrate is typically a material with at least some structural strength, such as glass, plastic, ceramic, or other similar materials. In many cases, the substrate is large enough that thermal expansion of the substrate over 10° C. temperature change can change the position of a target printing location by 50 μm or more. In some precision printing processes, drops of print material having diameter of 20 μm are deposited at a target location on the substrate having dimension of 30 μm, in some cases smaller, so position changes of 50 μm, or less, can cause printing faults.

To manage thermal expansion, the substrate is thermally stabilized using a gas cushion support. At 504, gas is flows to the substrate support to form a gas cushion between the substrate and the substrate support. The gas cushion is typically 10-50 μm thick, depending on gas flow rate. Oxygen-free or reduced-oxygen gases, such as oxygen depleted air, nitrogen or argon, are frequently used.

At 506, the gas used to establish and maintain the gas cushion is thermally contacted with a thermal control medium. A heat exchanger is typically used. The gas may be flowed through a plenum where tubes carry the thermal control medium through the plenum. The gas contacts the tubes and exchanges heat with the thermal control medium. Alternately, a jacket volume may be provided around the tube carrying the gas, and the thermal control medium may be flowed through the jacket volume. The thermal control medium may be water or any fluid capable of achieving a target temperature for the thermal control medium. In one instance, the thermal control medium is cooled to a temperature of about 5° C. to reduce heating of the substrate.

At 508, a temperature of the gas after the gas thermally contacts the thermal control medium is sensed to determine whether the gas is at or near a target temperature. A thermal sensor is used to sense temperature of the gas. The thermal sensor may be a pyroelectric sensor, such as a thermocouple, in physical contact with the gas. In other cases, a non-contact sensor may be used to sense a temperature of the surface of the tube or pipe carrying the gas away from the location of thermal contact with the thermal control medium.

At 510, flowrate or temperature of the thermal control medium is adjusted based on the gas temperature. If the gas temperature is too high, temperature of the thermal medium may be reduced, or flowrate may be raised or lowered to reduce the gas temperature, and vice versa. A thermal unit, such as a heater or cooler, is typically used to set the temperature of the thermal control medium. If the thermal control medium is close to a phase change temperature of the medium, flowrate of the thermal control medium can be used preferentially to adjust gas temperature. In one case, temperature of the thermal control medium is changed in increments of 0.1° C. every time the temperature is measured outside a tolerance range. For example, a temperature reading may be taken every second, or every half-second, according to parameters of the temperature sensor. Every time the temperature sensor senses a temperature that is above a tolerance range set in the controller, the controller controls the thermal unit to reduce temperature of the thermal control medium by 0.1° C. Every time the temperature sensor senses a temperature that is below the tolerance range, the controller controls the thermal unit to increase temperature of the thermal control medium by 0.1° C. When the temperature sensor senses a temperature that is within the tolerance range, the controller sends no control signal. In other cases, some form of PID control, or heuristic or model-based control, can be used.

In the event that large surface area for thermal exchange between the gas and the thermal control medium leads to poor scalability of thermal duty, multiple heat exchangers can be used to increase and decrease contact area scalably so that flowrate and temperature of the thermal control medium remains within tolerance ranges.

At 512, a temperature of the substrate is optionally sensed. A non-contact sensor such as an optical sensor can be used to sense the temperature of the substrate. The substrate temperature can be compared to a target to determine a deviation, and if the deviation is outside a tolerance range, the target temperature of the gas used for the gas cushion support can be adjusted to compensate. When the target temperature of the gas is adjusted, flowrate or temperature of the thermal control medium can be adjusted to bring the gas to the new target.

At 514, a print material is deposited on the substrate. The print material is ejected from one or more dispensers in droplets sized from 5 μm to 50 μm, depending on the print job, toward the substrate as the substrate is scanned past the dispensers. By virtue of thermal control, the target locations for the droplets on the substrate remain near the designed positions so that the droplets arrive at the target locations within a tolerance range.

Figure 6:
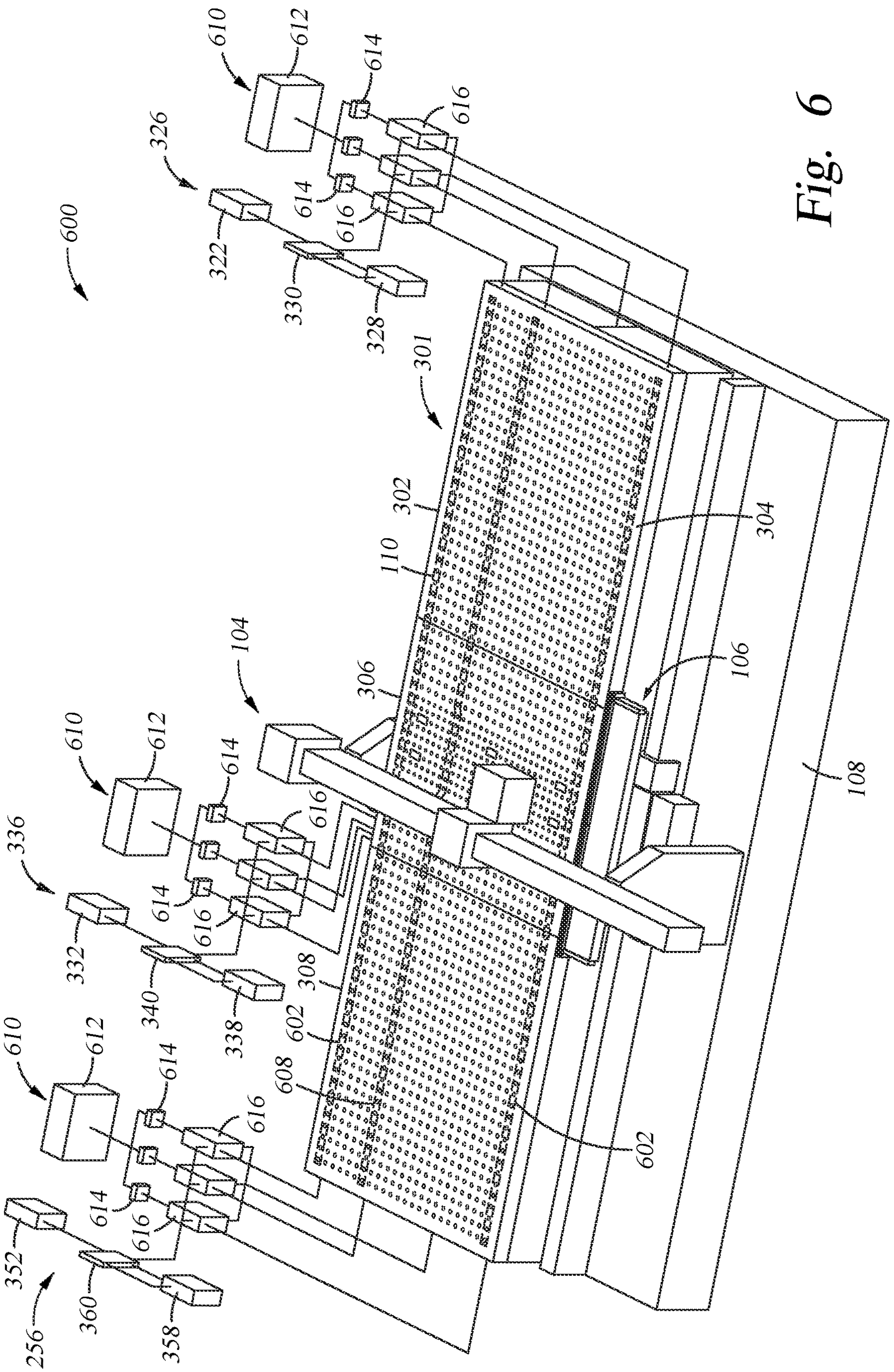
FIG. 6 is an isometric view of an inkjet printer according to another embodiment.

FIG. 6 is an isometric view of an inkjet printer 600 according to another embodiment. The inkjet printer 600 is similar to the inkjet printer 500, but the inkjet printer 600 also includes separate thermal control for substrate edge gas. Two edge regions 602 and one central region 608 of the substrate support are identified by dotted lines. Each section of the substrate support 304, 306, and 308 has a dedicated gas supply 610 for supplying gas to the edge regions 602 and the central region 608. Each gas supply 610 has a blower 612 fluidly coupled to three flow control devices 614 to control gas flow to each edge region 602 and the central region 608 in the respective section of the substrate support. Each flow control device 614 is coupled to a passive heat exchanger 616 that serves as an ambient exchanger. The flow of gas from the heat exchangers 330, 340 and 360 is directed to a respective passive heat exchanger 616 to provide thermal exchange between thermally conditioned gas exiting the heat exchangers 330, 340 and 360 and gas from the blowers 612. Compression of the gas by the blowers 612 adds some heat of compression to the gas. The passive heat exchangers 616 can be used to remove the heat of compression by thermal exchanged with the thermally conditioned gas exiting the heat exchangers 330, 340, and 360. The flow control devices 614 provide individual control of gas flow to each of the edge regions 602 and the central region 608 in each of the substrate support sections 304, 306, and 308.

Providing gas flow to the edge regions 602 and the central region 608 enables thermal control at substrate edges. Due to the geometric discontinuity at the substrate edge, specific gas flow may be needed in some cases to maintain substrate spacing at the edge of the substrate. The dedicated gas flow to the edge regions 602 enables edge spacing control to maintain edge spacing consistent with spacing of the rest of the substrate. Thermally controlling the gas supplied to the edge region of the substrate prevents any thermal excursions due to added heat from compression of the gas. Specific gas flow is provided to the central region 608 for edge control of substrates that do not extend the entire width of the substrate support. For example, when a substrate is processed in portrait format, the substrate edge may be positioned at the central region 608. The specific gas flow to the central region 608 thus provides edge control of such substrates. Edge control gas can be provided to any combination of openings in the substrate support by providing plenums, for example metal or plastic boxes, attached to the lower surface of the substrate support and by plumbing control gas to the plenums in any desired configuration.

While the foregoing is directed to embodiments of the present invention, other and further embodiments of the present disclosure may be devised without departing from the basic scope thereof, and the scope thereof is determined by the claims that follow.

What is claimed is:

1. A method, comprising:

using a gas cushion substrate support to support a substrate, the gas cushion substrate support comprising a metal support surface and a plurality of holes formed through the metal support surface;

flowing a gas through a gas conduit and through the plurality of holes to form a gas cushion between the substrate and the metal support surface to support the substrate;

depositing a print material on the substrate while the substrate is supported by the gas cushion; and thermally controlling the substrate by adjusting a flowrate of the gas, adjusting a temperature of the gas using a thermal control system coupled to the gas conduit, or both.

2. The method of claim 1, wherein thermally controlling the substrate further comprises:

measuring a temperature of the gas flowing through the gas conduit; and adjusting a flowrate of the gas flowing through the gas conduit based on the measured gas temperature.

3. The method of claim 1, wherein thermally controlling the substrate further comprises:

measuring a temperature of the gas flowing through the gas conduit; and adjusting a temperature of the gas flowing through the gas conduit based on the measured gas temperature.

4. The method of claim 1, wherein thermally controlling the substrate further comprises:

measuring a temperature of the substrate while the substrate is supported by the gas cushion; and adjusting a flowrate of the gas flowing through the gas conduit based on the measured substrate temperature.

5. The method of claim 1, wherein thermally controlling the substrate further comprises:

measuring a temperature of the substrate while the substrate is supported by the gas cushion; and adjusting a temperature of the gas flowing through the gas conduit based on the measured substrate temperature.

6. The method of claim 1, wherein the plurality of holes is a first plurality, the gas is a first gas, the gas conduit is a first gas conduit, and the gas cushion is a first gas cushion, and further comprising flowing a second gas through a second gas conduit and through a second plurality of holes formed through the metal support surface to form a second gas cushion between the substrate and the metal support surface to support the substrate, wherein the first plurality of holes is at a central region of the substrate support and the second plurality of holes is at an edge region of the substrate support.

7. The method of claim 6, further comprising adjusting a flowrate of the first gas independent of a flowrate of the second gas.

8. The method of claim 7, further comprising independently adjusting a temperature of the first gas and the second gas.

9. The method of claim 1, further comprising controlling a temperature of the gas using a heat exchanger coupled to the gas conduit.

10. The method of claim 1, wherein the substrate support comprises a plurality of sections, each having a metal support surface and a plurality of holed formed through the metal support surface, flowing a gas through a gas conduit and through the plurality of holes comprises flowing the gas through the plurality of holes of each of the sections to form a gas cushion, and thermally controlling the substrate comprises adjusting a temperature of flowrate of gas to each of the sections using the thermal control system.

11. The method of claim 1, wherein thermally controlling the substrate further comprises thermally coupling the substrate with the metal support surface.

12. A method, comprising:

using a gas cushion substrate support to support a substrate, the gas cushion substrate support comprising a metal support surface and a plurality of holes formed through the metal support surface;

flowing a gas through a gas conduit and through the plurality of holes to form a gas cushion between the substrate and the metal support surface to support the substrate;

exhausting gas from the gas cushion through a plurality of gas escape passages formed through the gas cushion substrate support;

depositing a print material on the substrate while the substrate is supported by the gas cushion; and thermally controlling the substrate by adjusting a flowrate of the gas, adjusting a temperature of the gas using a thermal control system coupled to the gas conduit, or both.

13. The method of claim 12, wherein the flowing a gas through a gas conduit and through the plurality of holes to form a gas cushion comprises flowing the gas through a gas flow passage formed in a support plate of the gas cushion substrate support to a gap between the support plate and a top member of the gas cushion substrate support that provides the support surface.

14. The method of claim 13, wherein the gas escape passages are formed through the top member and the support plate.

15. The method of claim 12, wherein thermally controlling the substrate further comprises:

measuring a temperature of the gas flowing through the gas conduit, a temperature of the substrate, or both; and adjusting the flowrate or temperature of the gas flowing through the gas conduit based on the measured gas temperature, substrate temperature, or both.

16. The method of claim 12, wherein thermally controlling the substrate further comprises thermally coupling the substrate and the metal support surface.

17. The method of claim 12, wherein thermally controlling the substrate comprises adjusting a temperature of the gas using a thermal control system that comprises a thermal unit that circulates and controls a thermal medium and a heat exchanger that thermally couples the thermal medium with the gas.

18. The method of claim 17, wherein the thermal control system controls thermal flux of the heat exchanger by controlling flowrate of the thermal medium.

19. A method, comprising:

using a gas cushion substrate support to support a substrate, the gas cushion substrate support comprising a metal top member, a support plate, and a plurality of holes formed through the metal support member and the support plate;

flowing a gas through a gas conduit and through the plurality of holes to form a gas cushion between the substrate and the metal support surface to support the substrate;

exhausting gas from the gas cushion through a plurality of gas escape passages formed through the top member and the support plate;

depositing a print material on the substrate while the substrate is supported by the gas cushion;

controlling the gas cushion by controlling a flowrate of the gas; and thermally controlling the substrate by adjusting a temperature of the gas using a thermal control system coupled to the gas conduit, the thermal control system comprising a thermal unit that circulates and controls a thermal medium and a heat exchanger that thermally couples the thermal medium with the gas.

20. The method of claim 19, wherein the top member is a porous body.

* * * * *